(12) United States Patent
Ridgway

(10) Patent No.: US 11,686,271 B1
(45) Date of Patent: Jun. 27, 2023

(54) LOCOMOTIVE DIESEL ENGINE CYLINDER HEAD COVER ASSEMBLY SEAL

(71) Applicant: Master Packing and Rubber Company, Cedar Rapids, IA (US)

(72) Inventor: Robert Ridgway, Northbrook, IL (US)

(*) Notice: Subject to any disclaimer, the term of this patent is extended or adjusted under 35 U.S.C. 154(b) by 0 days.

(21) Appl. No.: 17/470,517

(22) Filed: Sep. 9, 2021

(51) Int. Cl.
*F02F 11/00* (2006.01)
*F16J 15/10* (2006.01)

(52) U.S. Cl.
CPC .......... *F02F 11/00* (2013.01); *F16J 15/102* (2013.01); *F02F 11/002* (2013.01)

(58) Field of Classification Search
CPC ...... F16J 15/122; F16J 15/062; F16J 15/0818; F02F 7/006; F02F 11/002
See application file for complete search history.

(56) References Cited

U.S. PATENT DOCUMENTS

| | | | | |
|---|---|---|---|---|
| 4,593,659 A | * | 6/1986 | Wells | F02F 7/006 123/90.38 |
| 4,819,953 A | * | 4/1989 | Joh | F02B 77/00 277/924 |
| 5,511,518 A | * | 4/1996 | Jain | F01M 11/0004 123/90.38 |
| 6,224,058 B1 | * | 5/2001 | Drebing | F16J 15/025 277/316 |
| 2004/0232626 A1 | * | 11/2004 | Sakata | F16J 15/3212 277/602 |
| 2006/0012125 A1 | * | 1/2006 | Salameh | F02F 7/006 277/325 |
| 2006/0131818 A1 | * | 6/2006 | Diez | F16J 15/0825 277/592 |
| 2009/0217900 A1 | * | 9/2009 | Salameh | F02F 7/006 123/195 C |
| 2011/0227295 A1 | * | 9/2011 | Watanabe | F16J 15/062 277/591 |
| 2013/0106064 A1 | * | 5/2013 | Okuda | F02F 11/002 277/591 |

* cited by examiner

*Primary Examiner* — Long T Tran
(74) *Attorney, Agent, or Firm* — Charles T. Riggs, Jr.

(57) ABSTRACT

A method, system and device for the sealing of a locomotive diesel engine cylinder head support frame's cover assembly. The method, system and device comprise a one-piece elastomeric seal having a plurality of protrusions/legs/appendices specifically constructed for sealing the top external covering of the individual power assemblies to prevent oil leakage during the operation of the diesel engine. The diesel engine's cylinder head cover seal has a combination of a dimensional profile and a material composition(s) that extends the diesel engine's cylinder head support frame cover seal's contact integrity and life.

20 Claims, 10 Drawing Sheets

LOCOMOTIVE DIESEL ENGINE CYLINDER HEAD COVER ASSEMBLY SEAL

TECHNICAL FIELD

The exemplary teachings herein pertain to locomotive diesel engine cylinder head cover assembly seals or gaskets. Specifically, the present disclosure relates to a locomotive diesel engine cylinder head cover assembly seal or gasket with dimensional and material specifications providing for operational safety, durability and reliability in the rail industry, incorporated to prevent oil leakage through the mating contact surface with the cylinder head support frame during the operation of the diesel engine.

BACKGROUND

Typically, most diesel/electrical locomotives have a power generation source assembled into the locomotive to generate the electrical power required to drive the traction motors found on each of the multiple wheel sets. This power source has in the past been comprised of only two diesel engine configurations based on the combustion cycle, namely the two stroke Electro-Motive Division of General Motors (EMD), and the four stroke General Electric Transportation System (GETS). This unique and significant difference in the engine configuration specifically defines the required fluid lubrication and cooling system requirements for each of these two diesel engines' individual and multiple power assemblies.

The EMD locomotive diesel engine (see prior art FIG. 1) has multiple but separate and individual power assemblies, typically being 8, 12, 16 or 20 cylinders per this two-stroke diesel engine's Vee block arrangement. The power assemblies for a typical EMD 16 cylinder engine are assembled in groups of four, eight total on each bank of the engine's 45 degree Vee block (see prior art FIG. 2) along with all the supporting components, such as the camshafts, camshaft bearings, rocker arms, valve bridges, fuel injectors, fuel lines, and mechanical linkage (see prior art FIG. 3), and are all generally "splash" lubricated and cooled with the engine's pressurized lubricating oil that is directed to each of the power assemblies located inside the engine's cylinder head support frame assembly.

The cylinder head cover assembly itself, commonly referred to as the upper deck cover or top deck cover 2, is hinged on the back surface edge of the cylinder head support frame assembly 4, near the exhaust manifold located in the Vee of the engine block (see prior art FIG. 4). The cover assembly is then vertically lifted, with each of the cover sections having a handle, and held in place in order to provide the means of repeatedly inspecting, maintaining, and or replacing the power assemblies and all supporting components when required. As illustrated in an exploded view (see prior art FIG. 5), a seal or gasket 5 is responsible for providing the resistance to oil leakage upon the closing of the cover 2 and then applying the multitude of mechanical clamps 6 found on the cylinder head cover forcing the seal to seat/contact/seal on the mating cylinder head support frame assembly's contact surface 8. As can be seen in FIG. 6, the seal or gasket is located in a recess or channel 9 in a flange 7 of the cover 2 (seal 10 of the present disclosure shown partially removed at one corner of the cover 2), and extends all the way around the perimeter of the cover 2.

The current OEM locomotive diesel engine cylinder head support frame cover seal, shown in FIG. 8A (uncompressed) and 8B (compressed) in cross section in the cylinder head cover's seal recess 9, is a one-piece elastomeric design that has never properly sealed the cylinder head support frame contact surface 8 for an extended amount of engine operation or service time. The current OEM design, due to the forty-five degree Vee engine block, traps and holds the oil on the inside mating surface 8a of the cylinder head support frame 4, so that whenever the cylinder head cover is opened and lifted, oil leaks out and runs down the outside of the engine block. The cylinder head cover is continuously opened and closed for maintenance, repair and inspections which allows trapped oil to run down the side of the engine block and takes a toll on the seal's contact surfaces over time, damaging the seal itself, along with the environmental and operating temperature fluctuations affecting the current seal material, all eventually leading to oil leaks down the side of the engine block.

The oil leak on this particular area of the engine block itself is not considered detrimental to the engine operation, however, if the leak is severe, then the loss of oil will significantly impact the engine's oil reserve. Oil leaking from the cylinder head cover assembly has been found to have a serious impact by damaging the EPA locomotive engine compliance decals that are required to be placed on the engine block itself. FIGS. 9A and 9B illustrate this situation of engine cylinder cover seal leaks.

The following prior art references provide general background information regarding locomotive diesel engine cylinder head cover assembly seals or gaskets, and each are herein incorporated by reference:

Republic of Korea patent application publication number KR 0123095 Y1, entitled Gasket for Cylinder Head Cover, by Applicant Hyundai Motor Company, dated May 19, 1998.

Republic of Korea patent application publication number KR 19980020567 U, entitled Gasket for Cylinder Head Cover of Automobile Engine, by inventor Kwon Soon-hyuk, dated Jul. 17, 1998.

Republic of Korea patent application publication number KR 19980037385 A, entitled Gasket Structure for Airtightness of Cylinder Head, by inventor Cho Chung-yong, dated Aug. 5, 1998.

Republic of Korea patent application publication number KR 20020019147 A, entitled Gasket for Sealing Cylinder Head Cover, by Applicant Hyundai Motor Co Ltd., dated Mar. 12, 2002.

Republic of Korea patent application publication number KR 100338838 B1, entitled Structure for Mounting Seal of Cylinder Head Rocker Cover, by Applicant Hyundai Motor Co Ltd., dated May 30, 2002.

Republic of Korea patent application publication number KR 20020055060 A, entitled A Gasket Mounting Structure of Engine Head Cover, by Applicant Hyundai Motor Co Ltd., dated Jul. 8, 2002.

Republic of Korea patent application publication number KR 20030089915 A, entitled Headcover Gasket Structure for Prevention Oil-Leak of Automobile, by Applicant Hyundai Motor Co Ltd., dated Nov. 28, 2003.

Republic of Korea patent application publication number KR 20030008027 A, entitled Gasket Structure for Rocker Cover, by Applicant Hyundai Motor Co Ltd., dated Jan. 24, 2003.

China patent application publication number CN 201297218 Y, entitled Sealing Part of Cylinder Cover of Diesel Engine, by Applicant Zhejiang Xinchai Co Ltd, dated Aug. 26, 2009.

Republic of Korea patent application publication number KR 20060070192 A, entitled Gasket for Sealing Cylinder Head Cover of Engine, by Applicant Hyundai Motor Co Ltd., dated Jun. 23, 2006.

European Patent publication number EP 2341268 B1, entitled Gasket, by Applicants Nok Corp. and Mahle Filter Systems Japan Corp., dated Apr. 1, 2015.

Such prior art devices and methods suffer from numerous disadvantages, drawbacks and/or limitations. Further, these prior art devices and methods tend to be inefficient and outdated in both the mechanical design and chemical composition of the diesel engine's cylinder head cover seal environmental and operating requirements.

Therefore, a need exists for a locomotive diesel engine cylinder head support frame cover seal or gasket which overcomes these and other disadvantages and shortcomings of prior art seals/gaskets, and which prevents oil leakage. The exemplary teachings disclosed herein fulfill such a need and provide other advantages over prior art seals/gaskets.

SUMMARY

The exemplary teachings herein pertain to a method, system and device for sealing of the locomotive diesel engine cylinder head support frame cover assembly to the mating sealing contact surface of the cylinder head support frame assembly. This method, system and device comprises a one-piece elastomeric seal having a plurality of protrusions/legs/appendices specifically constructed for fluid sealing of the top external metal covering of the individual power assemblies and their associated components, namely camshaft, camshaft bearings, rocker arms, valve bridges, valves, fuel injectors, fuel lines and mechanical linkage, to prevent oil leakage through the mating contact surface with the cylinder head support frame during the operation of the diesel engine. This method, system and device for sealing combines elastomeric chemistry with the mechanical movement of elastomers under assembly compression and the associated environmental and operating temperature fluctuations to effectively provide the overhaul-to-overhaul durability and resistance to engine lubricating oil leakage while in service.

A disclosed embodiment of the locomotive diesel engine's cylinder head cover seal device comprises mechanical dimensions and material chemical composition(s) as follows: a) the gasket dimensional profile configuration and shape is configured to promote the compression forced material to flow from the cylinder head cover's seal recess to restrict lube oil passage or leak with a plurality of protrusions/legs/appendices designed to increase the clamping pressure on the cylinder head support frame assembly's mating surface, such that the oil will flow or move away from the cylinder head support frame's mating surface itself instead of trapping it and to maintain this sealing effect (compression set resistance); and b) the elastomeric material composition has properties to complement the mechanical features in order to enhance the resistance to compression set, in order to hold and maintain the dimensions and profile, and to provide the durability required for the environmental and operational temperature fluctuations experienced throughout the operation life from overhaul-to-overhaul service time.

The locomotive diesel engine cylinder head cover assembly seal of the present disclosure increases the sealing integrity of this severe gasketing application and provides a significantly extended length of operational service life of the locomotive diesel engine over that of the prior art OEM design.

Accordingly, it is an objective hereof to provide a method, system and device comprising a seal's dimensional profile configuration and shape to promote the compression forced material to flow from the cylinder head cover's seal recess to prevent the passage or leakage of lube oil by increasing the mechanical sealing clamp load on the cylinder head support frame assembly's mating contact sealing surface to maintain this sealing effect, (compression set resistance).

It is another objective hereof to provide a method, system and device for a seal's dimensional profile configuration and shape enhanced and modified to promote the flow of lubrication oil away from the seal itself preventing the trapping of such oil and the leaking of trapped oil whenever the cylinder head cover is opened and lifted off the cylinder head support frame.

It is another objective hereof to provide a method, system and device in which the material composition properties complement the mechanical design in order to enhance the resistance to compression set, in order to hold and maintain the dimensions and profile, and to provide the durability required for the environmental and operating temperature fluctuations experienced from overhaul-to-overhaul service time.

Additional objectives, advantages and features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

DETAILED DESCRIPTION

The following description refers to numerous specific details which are set forth by way of examples to provide a thorough understanding of the relevant method(s), system(s) and device(s) disclosed herein. It should be apparent to those skilled in the art that the present disclosure may be practiced without such details. In other instances, well known methods, procedures, components and/or hardware have been described at a relatively high-level, without detail, in order to avoid unnecessarily obscuring aspects of the present disclosure. While the description refers by way of example to locomotive diesel engine cylinder head cover assembly seals or gaskets and the installation and use thereof, it should be understood that the method(s), system(s) and device(s) described herein may be used in any situation where gaskets are needed or desired.

Figure 10A:
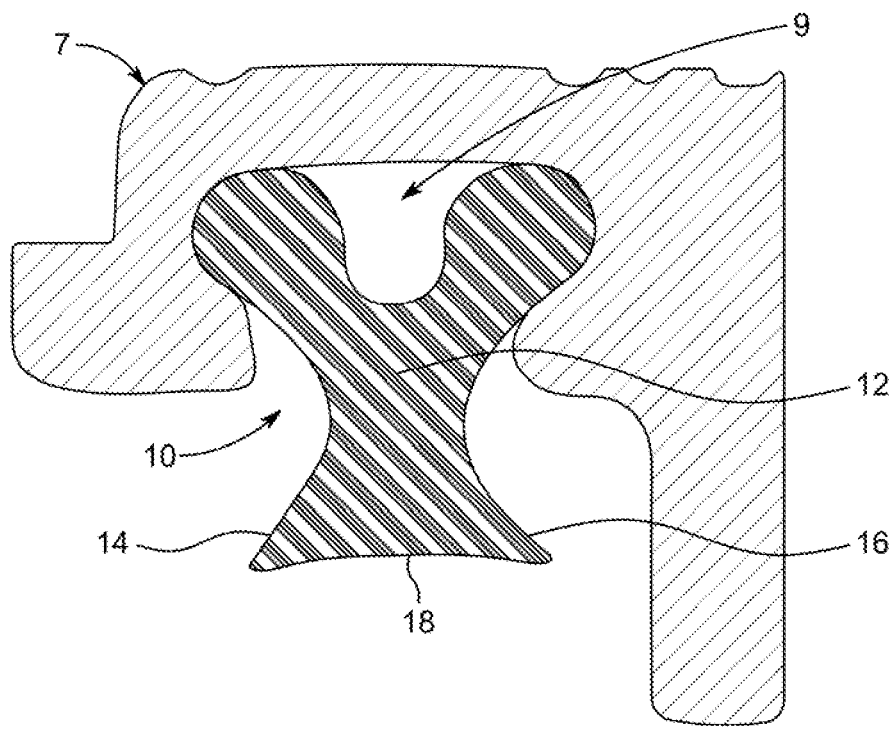
FIG. 10A is an enlarged cross sectional view of the seal or gasket of the present disclosure located in a flange of the cylinder head cover assembly, in an uncompressed state.
Figure 10B:
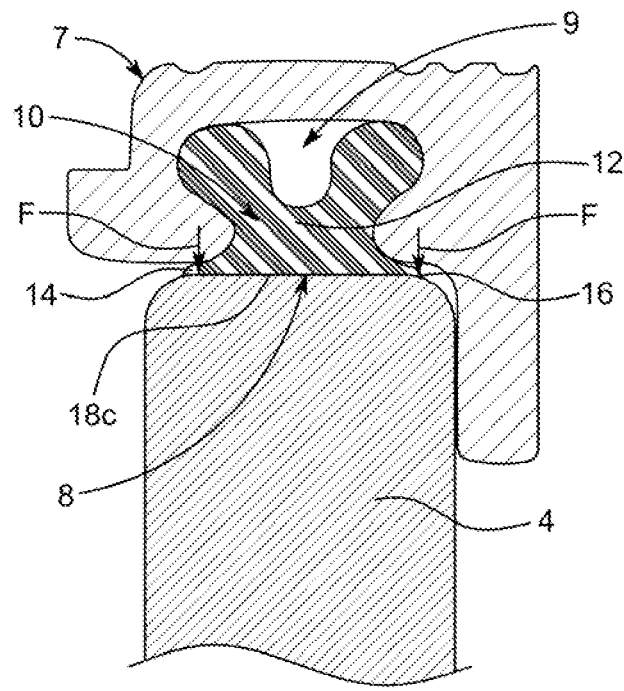
FIG. 10B is an enlarged cross sectional view of the seal or gasket of the present disclosure located in a flange of the cylinder head cover assembly, in a compressed state.
Figure 11:
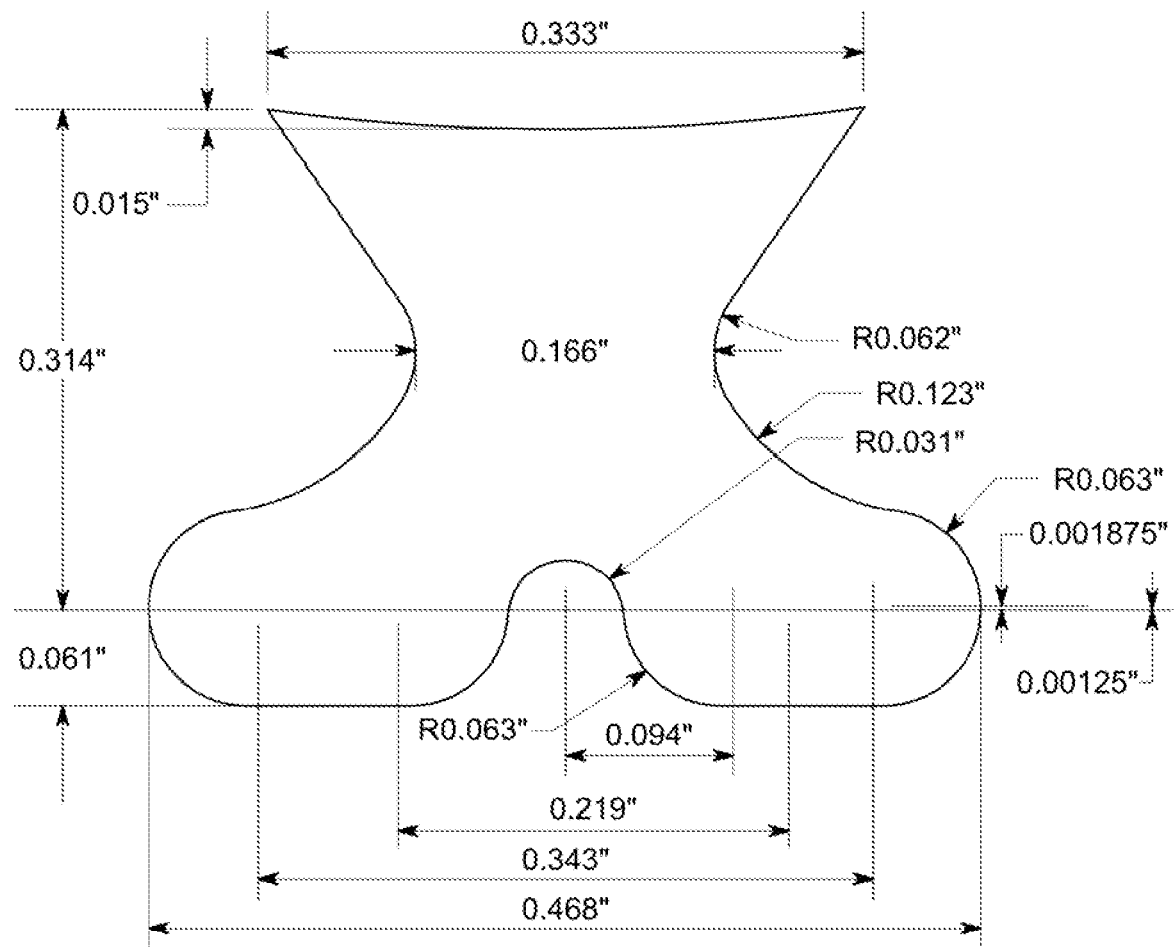
FIG. 11 is a dimensional view of the seal or gasket cross section of FIG. 10A.

FIGS. 10A, 10B and 11 illustrate one embodiment of the seal or gasket of the present disclosure. The disclosed seal or gasket 10 has a mechanical profile and a chemical composition that are combined for application on a locomotive diesel engine's cylinder head cover. The disclosed seal or gasket 10 contributes to the overall improved durability and performance of the cylinder head cover seal, thus promoting longer operational life and greater reliability from leakage failures. The dimensional profile and material chemical composition include the following: a) the seal's cross sectional dimensional profile configuration and shape having protrusions/legs/appendices 14 and 16 which promote the mechanically forced elastomeric material to flow outward and cover the entire cylinder head support frame contact surface 8 and provide the additional clamping compression on the cylinder head support frame 4 (shown in FIG. 10B) to increase the sealing effect (continuous compression set resistance), and b) the elastomeric material composition has properties to complement the mechanical design in order to enhance the resistance to compression set (in order to hold and maintain its dimensions and profile), and provide the durability required for the environmental and operational temperature fluctuations experienced from overhaul-to-overhaul service time.

The seal 10 material composition and durometer is preferably a high grade silicone extrusion of a 65 durometer. This gasket example meets the demands of a high performance seal, suitable for sealing locomotive engine pressurized lubricating oil.

FIG. 10A illustrates the seal or gasket 10 placed in the recess cavity 9 of flange 7 of the locomotive diesel engine's cylinder head cover. The seal or gasket 10 is placed into the recess cavity 9 as shown, and a body portion 12 extends downward from the recess cavity 9. The body portion 12 has protrusions/legs/appendices 14 and 16 as shown. In this manner, the seal's body portion contact surface 18 will rests upon and abut the cylinder head support frame contact surface 8, as shown in FIG. 10B.

Figure 1:
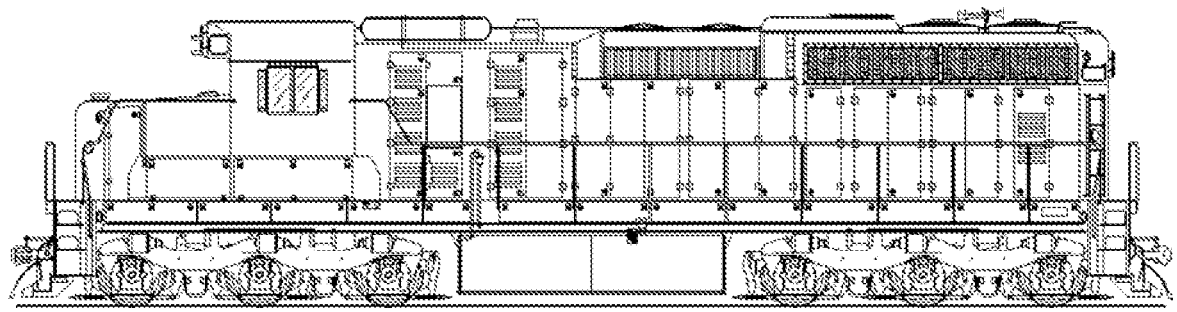
FIG. 1 is diagram of a prior art EMD locomotive engine.
Figure 2:
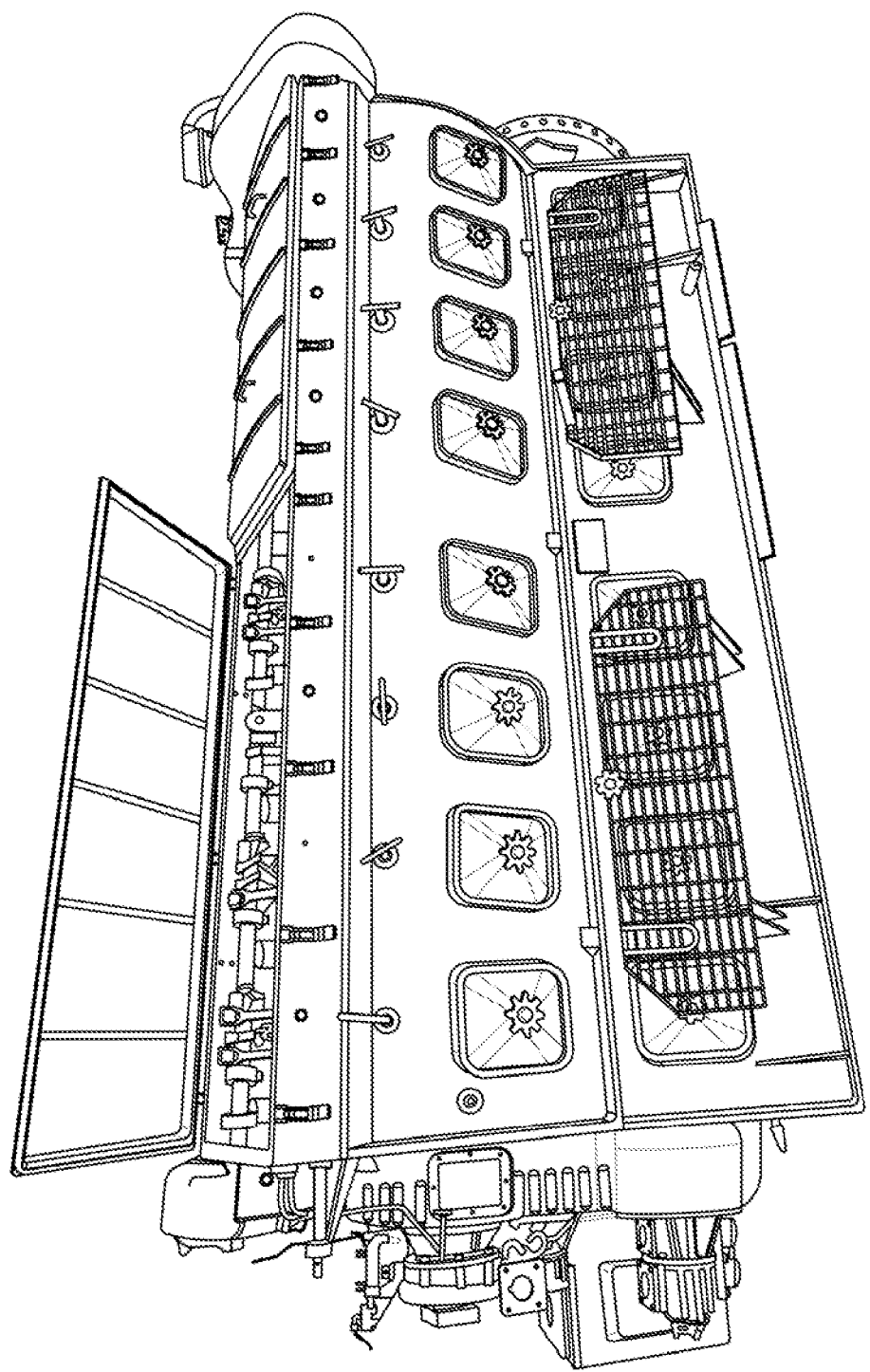
FIG. 2 is a picture of a prior art cylinder head cover and support frame assembly for a sixteen cylinder engine.
Figure 3:
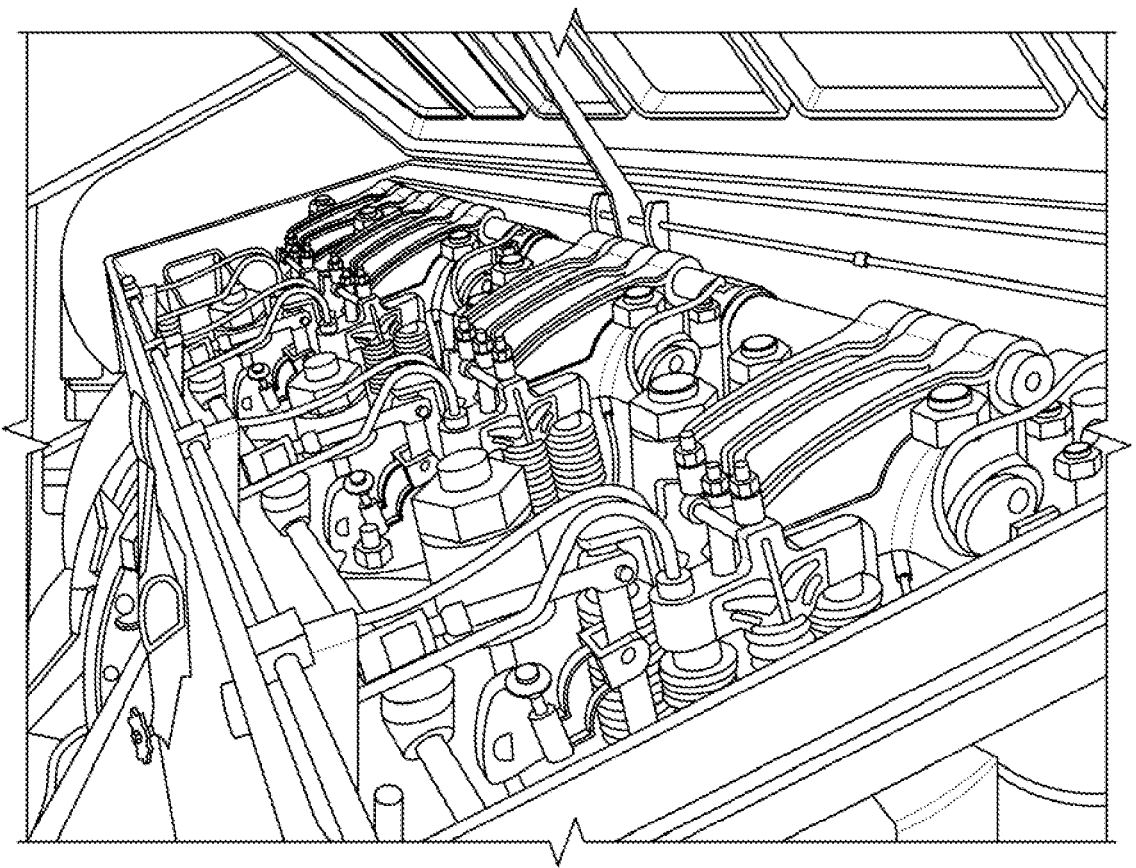
FIG. 3 is a picture of a prior art cylinder head cover assembly with power assemblies and components.
Figure 4:
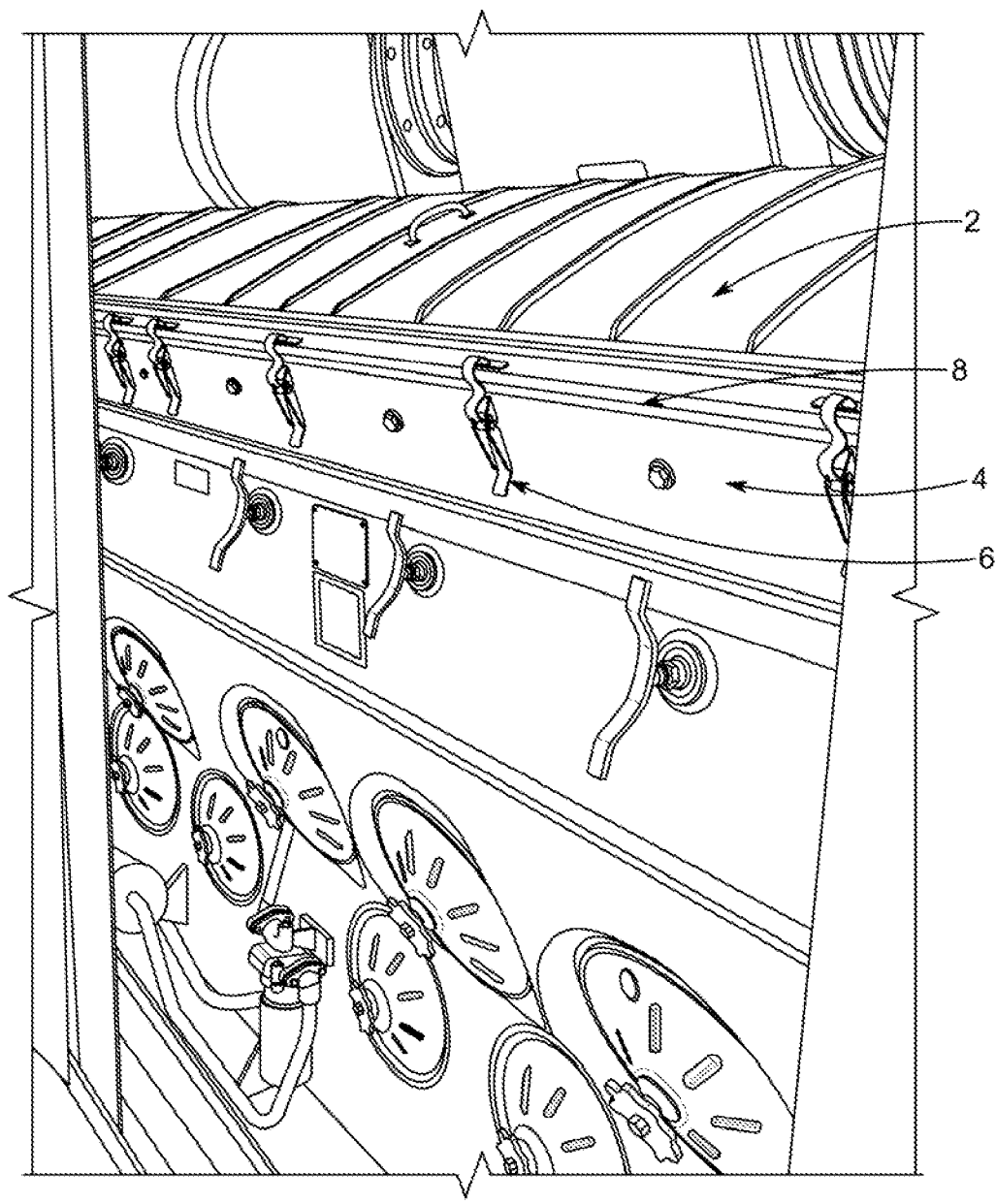
FIG. 4 is a prior art picture illustrating the prior art EMD diesel engine cylinder head cover on the cylinder head cover support frame.
Figure 5:
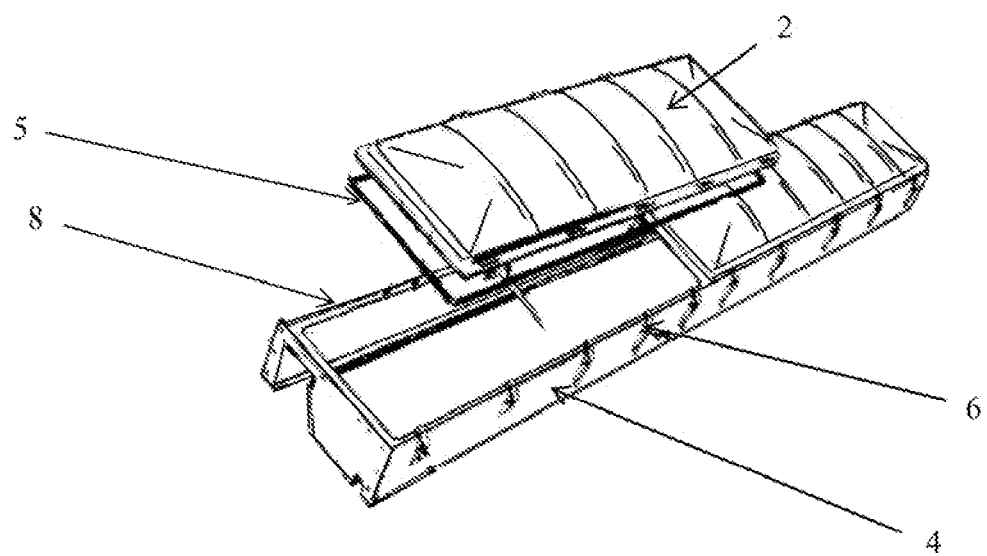
FIG. 5 is an exploded view of the prior art EMD diesel engine cylinder head cover and support frame assembly.
Figure 6:
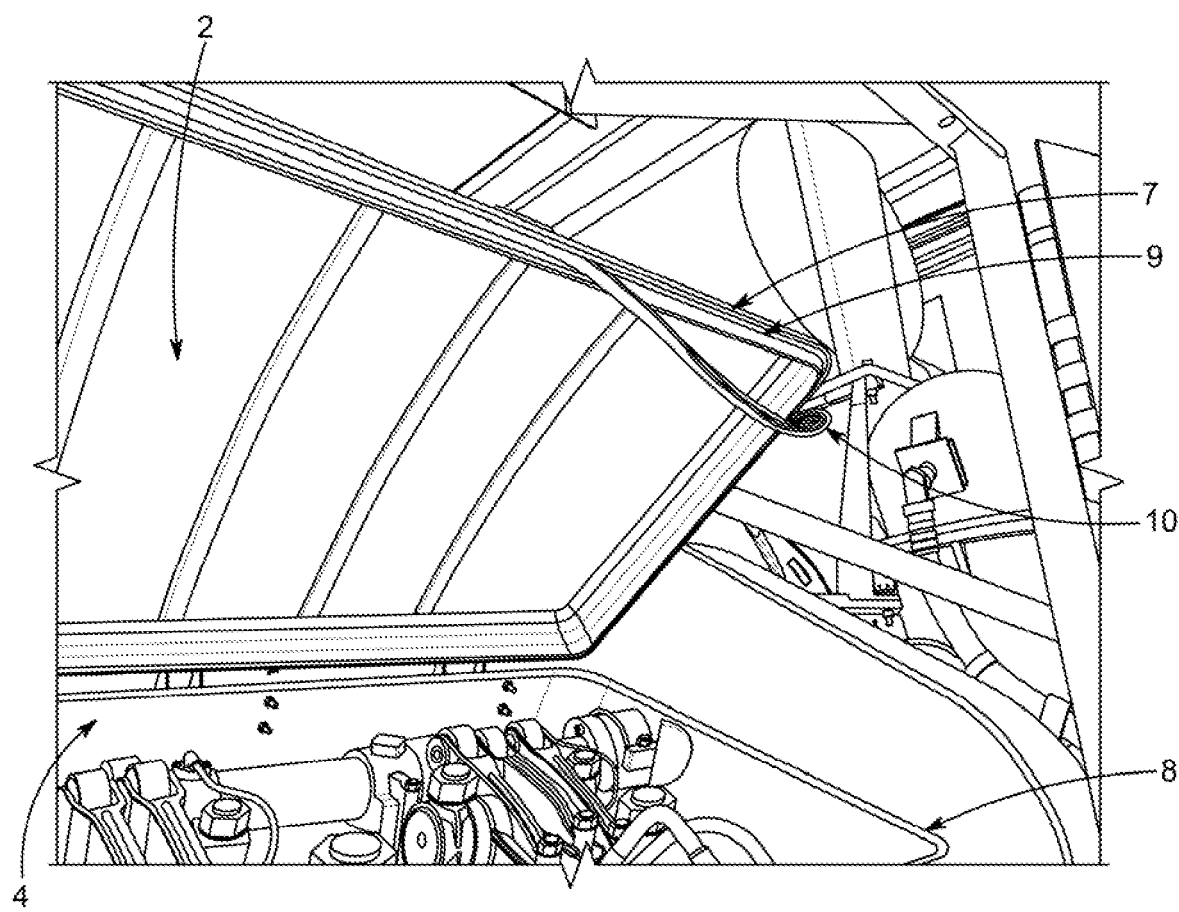
FIG. 6 is a perspective view of illustrating the seal location in the cylinder head cover assembly.
Figure 7:
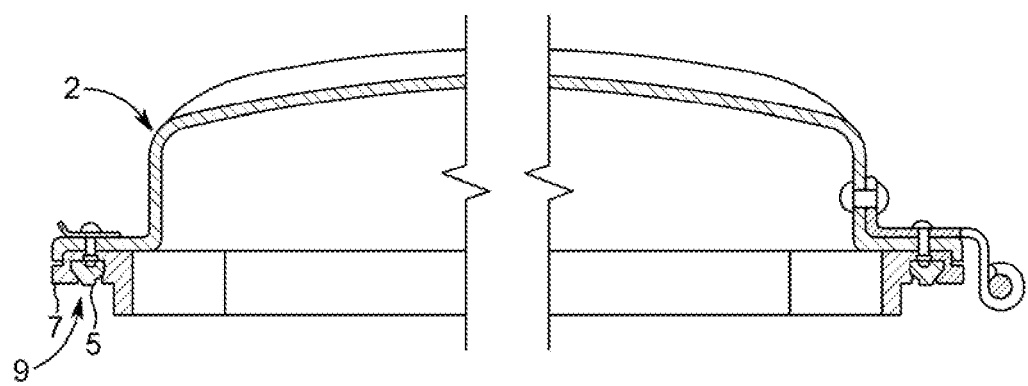
FIG. 7 is a cross sectional view of the prior art cylinder head cover assembly with seal.
Figure 8A:
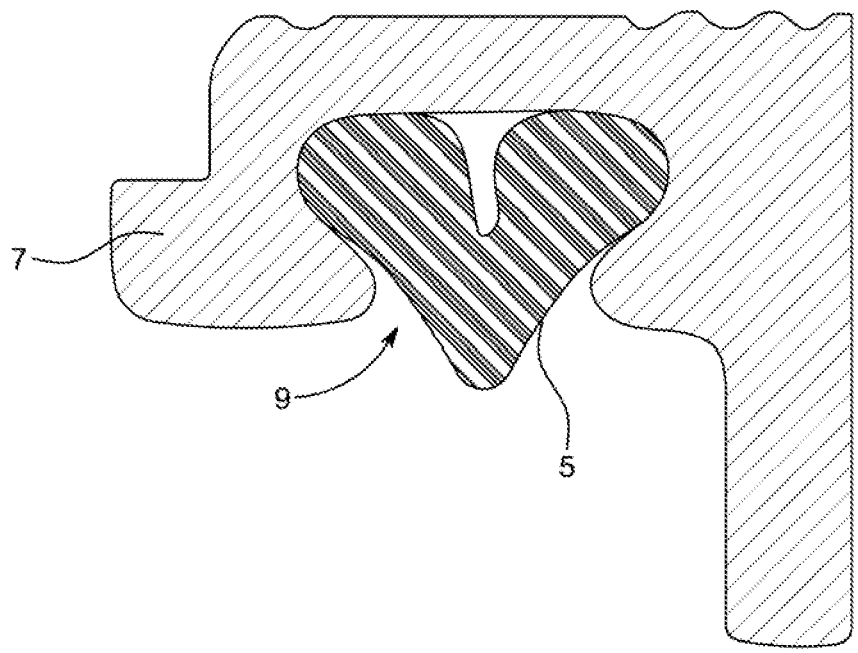
FIG. 8A is an enlarged cross sectional view of the prior art seal located in a flange of the cylinder head cover assembly, in an uncompressed state.
Figure 8B:
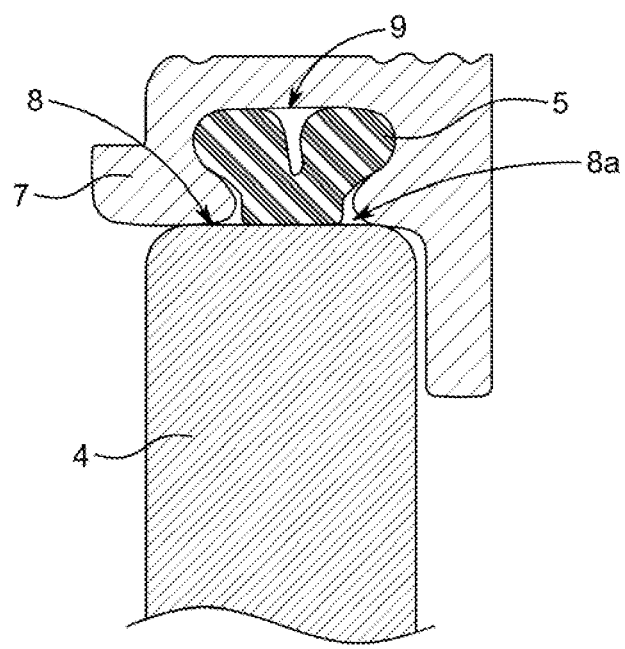
FIG. 8B is an enlarged cross sectional view of the prior art seal located in a flange of the cylinder head cover assembly, in a compressed state.
Figure 9A:
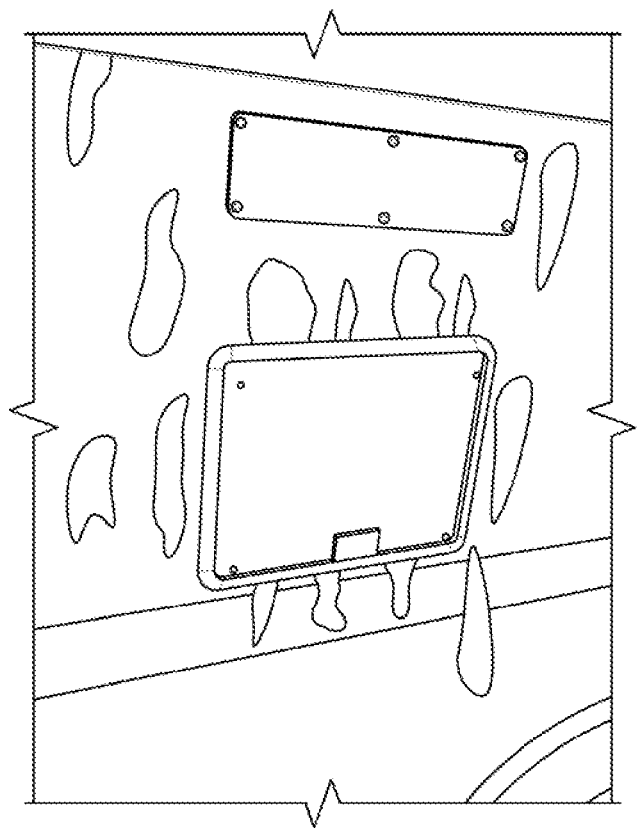
FIGS. 9A and 9B are pictures of engine lubricating oil leaks from prior art cylinder head cover seals fouling the EPA locomotive engine decal applied to the engine block.
Figure 9B:
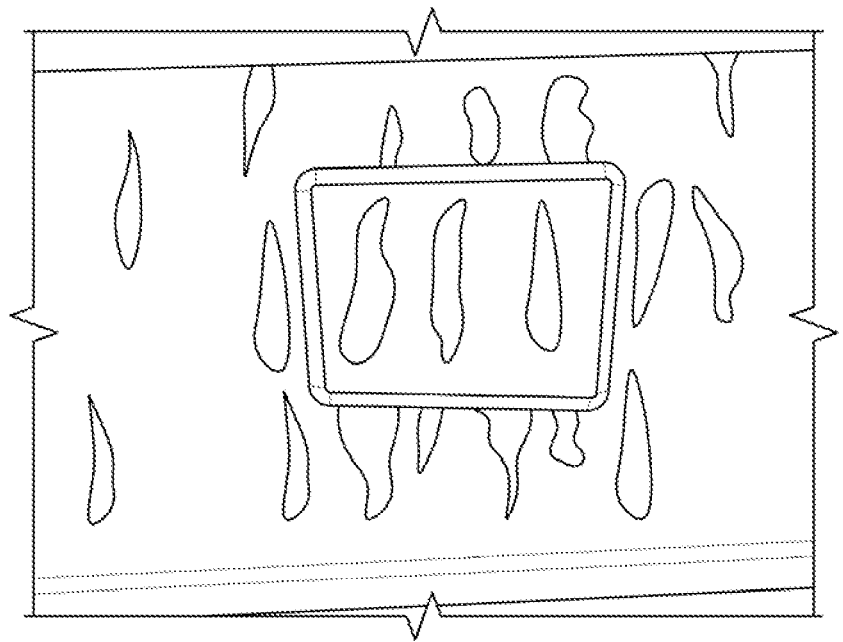

As can be seen in FIGS. 10A and 11, the seal body's contact surface 18 has a curvature and is designed to provide the maximum sealing contact forces at the time the cover 2 is clamped down to the frame 4. The seal 10 is designed with a profile that will extrude or move with the compressive force of the assembly, moving from its uncompressed state shown in FIG. 10A to its compressed shape shown in FIG. 10B, thereby extending over and forming a conforming contact portion 18c against the entire cylinder head support frame contact surface 8, thereby providing an additional or extra sealing force F against the cylinder head support frame contact surface 8 as the curvature of the contact surface 18 flattens out under compression, and preventing the oil from pooling on the cylinder head support frame contact surface 8 and leaking. As can be seen in FIG. 10B, the ends of the protrusions/legs/appendices 14 and 16 form a continuous contour with the rounded edges of the cylinder head support frame 4, thereby preventing oil from pooling on cylinder head support frame contact surface 8. Instead, any oil contacting the seal 10 will run right off, and away from the contact surface 8. Accordingly, it should be understood that the seal 10 includes sealing points at the outer edges of the cylinder head support frame contact surface 8, on each side, at the ends of protrusions/legs/appendices 14 and 16, upon compression of the seal 10 between the support frame 4 and the cylinder head cover flange 7, providing the additional or extra sealing force F at each point, instead of just the single, central point of contact of the prior art gasket of FIGS. 8A and 8B.

FIG. 11 illustrates a preferred shape of the cross section of the seal or gasket 10. Specifically, in its uncompressed state, the seal 10 has a body portion 12 and two protrusions/legs/appendices 14 and 16 extending therefrom. In a preferred embodiment, the body portion surface 18 has a width of 0.333 inches across, with a curvature depth of 0.015 inches, and the body portion 12 tapers or angles inward from protrusions/legs/appendices 14 and 16 to a width of 0.166 inches.

It should be understood that the size and/or shape of the body portion 12 and protrusions/legs/appendices 14 and 16 can vary without departing from the teachings herein. For example, the body portion 12 can be larger than shown, while the protrusions/legs/appendices 14 and 16 can be larger or smaller than shown so long as they prevent pooling of oil on the cylinder head support frame contact surface 8. Conversely, the body portion 12 can be smaller than shown, while the protrusions/legs/appendices 14 and 16 can be larger or smaller than shown so long as they prevent pooling of oil on the cylinder head support frame contact surface 8. The shape of the body portion 12 and/or the protrusions/legs/appendices 14 and 16 can also vary without departing from the teachings herein, and the curvature can be increased to provide additional sealing forces at the ends of the protrusions/legs/appendices 14 and 16. For example, the respective shapes may be generally triangular, quadrilateral, trapezoidal, semi-circular, semi-elliptical, or may resemble the shape of an airfoil or half airfoil or other suitable shape that will perform according to the teachings herein.

The exemplary method(s), system(s) and device(s) disclosed herein include is a unique combination of a dimensional profile and material composition(s) that will greatly improve and maintain the diesel engine's cylinder head cover seal's sealing integrity and extend the locomotive's service life until the next consequential locomotive engine overhaul occurs, wherein the seal is removed and renewed with a new seal.

This method of sealing combines elastomeric chemistry with the mechanical movement of elastomers under compression to effectively provide the resistance to lubricating oil leakage while in service operation providing the desired durability and integrity.

While the embodiment(s) disclosed herein are illustrative of the structure, function and operation of the exemplary method(s), system(s) and device(s), it should be understood that various modifications may be made thereto with departing from the teachings herein. Further, the components of the method(s), system(s) and device(s) disclosed herein can take any suitable form, including any suitable material or other components capable of adequately performing their respective intended functions, as may be known in the art.

While the foregoing discussion presents the teachings in an exemplary fashion with respect to the disclosed method(s), system(s) and device(s) for providing a seal between a locomotive engine cylinder head cover assembly and frame, it will be apparent to those skilled in the art that the present disclosure may apply to other method(s), system(s) and device(s) utilizing the disclosed gasket technologies. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A gasket comprising:
    a cross-sectional profile, wherein the cross-sectional profile defines:
        an upper portion defining an upper end;
        a body portion integral with the upper portion and defining a central portion; and
        a lower portion integral with the body portion and defining a lower end, wherein the lower portion includes a first protrusion/leg/appendice and a second protrusion/leg/appendice at the lower end and defining a sealing edge from the first protrusion/leg/appendice to the second protrusion/leg/appendice, and wherein the first protrusion/leg/appendice and the second protrusion/leg/appendice each have an outer end, and each forms a sealing surface contact point at its outer end when under compression.

2. The gasket of claim 1, wherein lower portion defines sloped exterior sides each sloping inward from each outer end of each protrusion/leg appendice towards the body portion to provide for oil run-off.

3. The gasket of claim 1, wherein the lower portion defines an inwardly curved contact surface along the sealing edge in an uncompressed state.

4. The gasket of claim 3, wherein the lower portion defines a flat contact surface along the sealing edge in a compressed state.

5. The gasket of claim 3, wherein the upper portion defines two arm portions.

6. The gasket of claim 3, wherein the inwardly curved contact surface defines a curvature depth of 0.015 inches.

7. The gasket of claim 1, wherein the gasket comprises a high grade silicone extrusion of a 65 durometer.

8. A locomotive diesel engine cylinder head cover assembly seal device, for sealing between a locomotive diesel engine cylinder head cover assembly and a diesel engine cylinder head support frame assembly, comprising:
    a one-piece elastomeric gasket having a cross-sectional profile, wherein the cross-sectional profile defines:
    an upper portion defining an upper end;
    a body portion integral with the upper portion and defining a central portion; and
    a lower portion integral with the body portion and defining a lower end, wherein the lower portion includes a first protrusion/leg/appendice and a second protrusion/leg/appendice at the lower end and defining a sealing edge from the first protrusion/leg/appendice to the second protrusion/leg/appendice, and wherein the first protrusion/leg/appendice and the second protrusion/leg/appendice each have an outer end, and each forms a sealing surface contact point at its outer end when under compression.

9. The device of claim 8, wherein the lower portion defines an extrudable contact portion along the sealing edge for contacting along an entire contact surface of the cylinder head support frame when under compression, including at a central location and each side end location of the contact surface of the cylinder head support frame.

10. The device of claim 8, wherein the lower portion defines a sloped exterior sides each sloping inward from each outer end of each protrusion/leg/appendice towards the body portion to provide for oil run-off.

11. The device of claim 8, wherein the lower portion defines an inwardly curved contact surface along the sealing edge in an uncompressed state.

12. The device of claim 11, wherein the lower portion defines a flat contact surface along the sealing edge in a compressed state.

13. The device of claim 11, wherein the upper portion defines two arm portions.

14. The device of claim 11, wherein the inwardly curved contact surface defines a curvature depth of 0.015 inches.

15. The device of claim 8, wherein the gasket comprises a high grade silicone extrusion of a 65 durometer which provides for resistance to compression set.

16. A method of sealing between a locomotive diesel engine cylinder head cover assembly and a diesel engine cylinder head support frame assembly, comprising the steps of:
    removing an existing gasket from a flange of the diesel engine cylinder head cover assembly;
    placing a one-piece elastomeric gasket in the flange of the diesel engine cylinder head cover assembly, wherein the one-piece elastomeric gasket has a cross-sectional profile defining an upper portion defining an upper end, a body portion integral with the upper portion and defining, a central portion, and a lower portion integral with the body portion and defining a lower end, wherein the lower portion includes a first protrusion/leg/appendice and a second protrusion/leg/appendice at the lower end and defining a sealing edge from the first protrusion/leg/appendice to the second protrusion/leg/appendice, and wherein the first protrusion/leg/appendice and the second protrusion/leg/appendice each have an outer end, and each forms a sealing surface contact point at its outer end when under compression; and
    clamping the diesel engine cylinder head cover assembly to the diesel engine cylinder head support frame assembly to compress the one-piece elastomeric gasket therebetween and forming a seal along the sealing edge.

17. The method of claim 16, further comprising the steps of:
    defining an extrudable contact portion along the sealing edge on the lower portion; and
    compressing the gasket to contact along an entire contact surface of the cylinder head support frame when under compression, including at a central location and each side end location of the contact surface of the cylinder head support frame.

18. The method of claim 16, further comprising the step of defining in the lower portion sloped exterior sides each sloping inward from each outer end of each protrusion/leg/appendice towards the body portion to provide for oil run-off.

19. The method of claim 16, further comprising the step of generating additional sealing force via an inwardly curved contact surface along the sealing edge and flattening the inwardly curved contact surface under compression.

20. The method of claim 16, further comprising the step of forming the gasket from a high grade silicone extrusion of a 65 durometer to provide resistance to compression set.

\* \* \* \* \*